(12) United States Patent
Nalewajek et al.

(10) Patent No.: US 8,652,244 B2
(45) Date of Patent: Feb. 18, 2014

(54) USE OF LOW GLOBAL WARMING POTENTIAL (LGWP) SOLVENTS FOR FINGER PRINT DEVELOPMENT APPLICATIONS

(75) Inventors: David Nalewajek, West Seneca, NY (US); Andrew Joseph Poss, Kenmore, NY (US); Rajiv Ratna Singh, Getzville, NY (US); Cheryl Cantlon, Clarence Center, NY (US)

(73) Assignee: Honeywell International Inc., Morristown, NJ (US)

( * ) Notice: Subject to any disclaimer, the term of this patent is extended or adjusted under 35 U.S.C. 154(b) by 200 days.

(21) Appl. No.: 13/078,152

(22) Filed: Apr. 1, 2011

(65) Prior Publication Data

US 2012/0251703 A1  Oct. 4, 2012

(51) Int. Cl.
*C09D 13/00* (2006.01)
*A61B 5/103* (2006.01)
*A61B 5/117* (2006.01)
*C09D 11/00* (2006.01)

(52) U.S. Cl.
USPC ............... 106/31.2; 106/31.32; 106/31.58; 427/1

(58) Field of Classification Search
USPC .................. 427/1; 103/31.2, 31.32, 31.58
See application file for complete search history.

(56) References Cited

U.S. PATENT DOCUMENTS

2009/0269478 A1  10/2009  Nalewajek

FOREIGN PATENT DOCUMENTS

| JP | 2003-061937 A |   | 3/2003 |
|----|---------------|---|--------|
| JP | 2008307195 A  | * | 12/2008 |
| WO | 2010-035748 A1 |  | 4/2010 |
| WO | 2010-085397 A1 |  | 7/2010 |

OTHER PUBLICATIONS

Siegfried Ruhemann, "Cyclic Di- and Tri-ketones," J. Chem. Soc., 1910, vol. 97, pp. 1438-1449.
Svante Odén et al., "Detection of Fingerprints by the Ninhydrin Reaction," Nature, 1954, vol. 173, pp. 449-450.
C. Anthony Pounds et al., "The Use of 1,8-Diazafluoren-9-one (DFO) for the Fluorescent Detection of Latent Fingerprints on Paper. A Preliminary Evaluation," Journal of Forensic Sciences, 1990, vol. 35, No. 1, pp. 169-175.
Dudley F. Hewlett et al., "An Operational Trial of Two Non-ozone Depleting Ninhydrin Formulations for Latent Fingerprint Detection," Journal of Forensic Identification, 1999, vol. 49, No. 4, pp. 388-396.
Sarah J. Gardner et al., "Optimization and Initial Evaluation of 1,2-Indandione as a Reagent for Fingerprint Detection," J. Forensic Sci., Nov. 2003, vol. 48, No. 6, pp. 1288-1292.
Christophe Champod et al., "Fingerprints and Other Ridge Skin Impressions," CRC Press, 1st Edition, 2004, pp. 128-131.
Renee Jelly et al., "The Detection of Latent Fingermarks on Porous Surfaces using Amino Acid Sensitive Reagents: A Review," Anal. Chim. Acta. 2009, vol. 652, pp. 128-142.
Christie Wallace-Kunkel el al., "Optimisation and Evaluation of 1,2-Indanedione for use as a Fingermark Reagent and Its Application to Real Samples," Forensic Sci. Int. 2007, vol. 168, pp. 14-26.
International Search Report and Written Opinion of the International Searching Authority in counterpart International Application No. PCT/US2012/030728, report issued Oct. 10, 2012.

* cited by examiner

*Primary Examiner* — Kelly M Gambetta
(74) *Attorney, Agent, or Firm* — Kenyon & Kenyon LLP

(57) ABSTRACT

Developing compositions are provided herein for use in producing a visibly detectable image of a latent physiological biometric. The developing compositions include a carrier solvent that includes at least one $C_3$-$C_4$ hydrofluorocarbon olefin or at least one hydrochlorofluorocarbon olefin.

10 Claims, No Drawings

USE OF LOW GLOBAL WARMING
POTENTIAL (LGWP) SOLVENTS FOR
FINGER PRINT DEVELOPMENT
APPLICATIONS

FIELD OF THE INVENTION

The present technology relates to compositions and method for detecting latent biological markers. More specifically, the present technology relates to latent fingerprint detection compositions comprising organic solvents classified as Low Global Warming Potential (LGWP) molecules.

DESCRIPTION OF RELATED ART

Fingerprints can be used to link a criminal suspect to a crime and, therefore, are one of the most valuable pieces of evidence that can be gathered at a crime scene. Fingerprints generally are classified into three categories: visible, impression and latent. While visible and impression prints can be readily seen with the unaided eye and can be documented by photography, latent fingerprints are visually undetectable without the aide of chemical, physical, or electrical processing techniques. Most latent fingerprints are invisible deposits of natural secretions of skin on the surface of an article which typically occur as impressions corresponding to the friction ridges of the skin. These secretions, which are produced by the eccrine glands, typically comprise water, soluble amino acids, peptides, salts, lipids, and the like. It is possible to transform these deposits into a visibly detectable image. When the impressions form patterns that correspond to the unique friction ridges of a person's finger, palm, etc, the latent fingerprint can be useful in dactyloscopy.

To visibly detect and analyze latent fingerprints, the residue must be processed, preferably by developing a composition comprising an imaging reagent in a carrier solvent. For example, ninhydrin, which was discovered in 1910, (Ruhemann et al., *J. Chem. Soc.* 1910, 97, 1438-49), has long been used to detect latent fingerprints. (Oden et al., *Nature*, 1954, 173, 449). More recently, other compounds, such as 1,8-diazafluoren-9-one (DFO) and 1,2-indanedione, have been used as imaging reagents for imaging latent fingerprints. (See, e.g., Pounds, et al., *J. For. Sci.*, 1990, 35 (1), 169-175 and Gardener et al. *J. For. Sci.*, 2003, 48 (6), 1-5). Both of these imaging reagents react with the amino acids and amines derived from peptides and/or proteins (e.g., terminal amines or lysine residues) present in eccrinal secretions to produce a dye that is visually detectable. Ninhydrin, in particular, degrades amino acids into aldehydes, ammonia, and $CO_2$ through a series of reactions. A portion of the ninhydrin is reduced into hydrindantin. A portion of the remaining ninhydrin condenses with ammonia and hydrindantin to produce an intensely blue or purple pigment, also known as Ruhemann's purple. Accordingly, when an eccrine residue exists in a pattern, such as the ridges corresponding to a fingerprint, this pigment renders the otherwise latent fingerprint into a visually detectable image. DFO also interacts with amino acids in eccrine residue to produce pale pink image. This observation image can be enhanced by using 560-620 nm light since the DFO-amino acid complex is strongly luminescent. (Champod et al., "Fingerprints and Other Ridge Skin Impressions" 1$^{st}$ edition, CRC Press, 2004, 128-131).

In addition to an imaging reagent, such as ninhydrin or DFO, developing compositions typically include a carrier solvent. For example, certain ninhydrin formulations have used 1,1,2-trichlorotrifluoroethane (CFC-113) as a carrier solvent. (Hewlett et al., *J. For. Identification*, 1999, 49 (4), 388). However, due to its negative impact on the earth's ozone layer, CFC-113 is no longer used commercially.

Hydrochlorofluorocarbons ("HCFCs"), such as 1,1-dichloro-1-fluoroethane (HCFC-141b), are also useful as carrier solvents in certain applications but have a lower ozone depletion potential (ODP) compared to CFCs. Therefore, HCFCs are used commonly as replacements for CFC carrier solvents. However, these types of compounds are also now being phased out of commercial use due to their relatively high global warming potential (GWP).

While hydrofluorocarbons (HFCs) generally possess a lower GWP compared to HCFCs, identifying HFC replacement compounds that are suitable as a carrier solvent for imaging reagents is difficult. For example, HFC-4310mee has been studied as a potential replacement carrier solvent, but this compound possesses a relatively high GWP (=1500 relative to $CO_2$) and is not effective as a carrier solvent for DFO. (Hewlett et al., *J. For. Identification*, 1999, 49 (4), 338).

In pending U.S. application Ser. No. 12/422,260, filed Apr. 11, 2009, $C_3$-$C_4$ hydrofluorocarbons are described that can be effectively used as carrier solvents in compositions used to detect latent fingerprints and other biometrics. These carrier solvents generally have an ozone depletion value close to zero; have low global warming potential (e.g., below 1000); are volatile, non-toxic, and non-flammable; exhibit sufficient solubility for chemical reagents capable of imaging eccrinal residues; and are relatively non-polar to allow for proper development of the fingerprints for image capture. However, since these solvents still have a GWP value associated with them, the identification of solvents having even a lower GWP value would be beneficial to the environment.

Accordingly, there remains a need to identify additional carrier solvents suitable as a replacement for CFCs, HCFCs and HFCs that would not have the limitations and environmental shortcomings attributed to these materials.

SUMMARY OF THE INVENTION

The present technology relates to $C_3$-$C_4$ hydrofluorocarbon olefins (HFOs) and hydrochlorofluorocarbon olefins (HCFOs) that can be effectively used as carrier solvents in compositions used to detect latent fingerprints and other biometrics.

In one aspect, a developing composition for use in producing a visibly detectable image of a latent physiological biometric is provided that includes at least one imaging reagent in a carrier solvent comprising at least one $C_3$-$C_4$ hydrofluorocarbon olefin (HFO) or at least one hydrochlorofluorocarbon olefin (HCFO). The at least one imaging reagent can be, for example, selected from the group consisting of ninhydrin, hydrindantin, 1,8-diazafluoren-9-one, 1,2-indanedione, and derivatives thereof. Additionally, in some examples, the at least one $C_3$-$C_4$ hydrofluorocarbon olefin or hydrochlorofluorocarbon olefin can be selected from the group consisting of 1-chloro-3,3,3-trifluoropropene, cis-1,3,3,3-tetrafluoropropene and cis-1,1,1,4,4,4-hexafluoro-2-butene.

In another aspect, a method for producing a visibly detectable image of a latent physiological biometric is provided that includes the steps of: (a) contacting a latent biometric deposited on a surface of an article with a developing composition, wherein the latent biometric comprises a pattern of residue derived from an eccrinial gland, and (b) reacting the imaging reagent with the residue to produce a dye, wherein said dye forms a visually detectable image corresponding to at least a portion of said pattern. The developing composition includes a solution comprising at least one imaging reagent in a carrier solvent that includes at least one $C_3$-$C_4$ hydrofluorocarbon olefin or hydrochlorofluorocarbon olefin. The at least one imaging reagent can be, for example, selected from the group consisting of ninhydrin, hydrindantin, 1,8-diazafluoren-9-one, 1,2-indanedione, and derivatives thereof. Additionally, in some examples, the at least one $C_3$-$C_4$ hydrofluorocarbon olefin or hydrochlorofluorocarbon olefin can be selected from the group consisting of 1-chloro-3,3,3-trifluoropropene, cis-1,3,3,3-tetrafluoropropene and cis-1,1,1,4,4,4-hexafluoro-2-butene.

DETAILED DESCRIPTION

The present technology relates to developing composition for use in producing a visibly detectable image of a latent physiological biometric, and methods of using such developing composition for producing a visibly detectable image of a latent physiological biometric. The developing compositions include at least one imaging reagent capable of rendering visual images of a latent biometric in a carrier solvent that includes at least one $C_3$-$C_4$ hydrofluorocarbon olefin (HFO) or at least one hydrochlorofluorocarbon olefin (HCFO).

Suitable carrier solvents of the present technology that include at least one $C_3$-$C_4$ hydrofluorocarbon olefin or at least one hydrochlorofluorocarbon olefin preferably have a combination of desirable environmental and functional properties. For example, environmentally, the carrier solvents can have an ozone depletion potential (ODP) that is zero or about zero. Carrier solvents may also have a low global warming potential, which can preferably be less than or equal to about 10 relative to $CO_2$. Functionally, carrier solvents are preferably volatile, non-toxic, and non-flammable. Carrier solvents preferably also exhibit sufficient solubility for chemical reagents capable of imaging eccrinal residues, and may be relatively non-polar to allow for proper development of the fingerprints for image capture.

As used herein, the term "biometric" means a physiological deposit produced by a person, wherein the deposit is related to the shape, form, and/or pattern of dermal ridges of a person's skin, for example a fingerprint, palm geometry, foot print, toe print, and the like. Preferred biometrics include those that produce a unique or rarely occurring mark that can be associated with an individual, such as fingerprints. Examples of physiological deposits include residues derived from natural secretions of the eccrine gland present on friction ridge skin. Such residues typically comprise water and one or more organic compounds such as soluble amino acids, peptides, salts, lipids, and the like. Specific organic compounds include alanine, asparagine, aspartic acid, cysteine, glutamic acid, glutamine, glycine, proline, serine and tyrosine.

As used herein, the term "latent", with respect to biometric, means an invisible impression of a portion of a person's body that results from the person contacting the surface of an object and the term "invisible" means visually imperceptible without the aid of a device or developing process.

In examples where the carrier solvent includes at least one $C_3$-$C_4$ hydrofluorocarbon olefin, the $C_3$-$C_4$ hydrofluorocarbon olefins can be of the general formula:

where n is selected from the group consisting 3-4, m is selected from the group consisting of 1-4, y is selected from the group consisting of 0-1, and z is equal to (2n)−m−y. Examples of such $C_3$-$C_4$ hydrofluorocarbons that are useful with this technology include, but are not limited to: tetrafluoropropenes, hexafluorobutenes, and chlorotrifluoropropenes. One example of a suitable tetrafluoropropene is 1,3,3,3-tetrafluoropropene, particularly the cis isomer thereof, which is 1,3,3,3-tetrafluoropropene (HFO-1234ze cis). Examples of suitable hexafluorobutenes include 1,1,1,3,3,3-hexafluorobutene, and the cis and trans isomers of $C_4H_2F_6$, particularly cis-1,1,1,4,4,4-hexafluoro-2-butene. Examples of suitable chlorotrifluoropropenes include the E and Z isomers of 1-chloro-3,3,3-trifluoropropene.

In examples where the carrier solvent includes at least one hydrochlorofluorocarbon olefin, the hydrochlorofluorocarbon olefin can be a chlorotrifluoropropene, a chloropentafluoropropene, or an isomer of either a chlorotrifluoropropene or a chloropentafluoropropene. One example of a suitable isomer of chlorotrifluoropropene is 1-chloro-3,3,3-trifluoropropene (HCFO-1233zd). One example of a suitable isomer of chloropentafluoropropene is 2-chloro-1,1,3,3,3-pentafluoropropene (CFO-1215xc).

Carrier solvents of the present technology can include at least one $C_3$-$C_4$ hydrofluorocarbon olefin, at least one hydrochlorofluorocarbon olefin, or mixtures thereof. For example, a carrier solvent can include two or more $C_3$-$C_4$ hydrofluorocarbon olefins, two or more hydrochlorofluorocarbon olefins, or a mixture of at least one $C_3$-$C_4$ hydrofluorocarbon olefin and at least one hydrochlorofluorocarbon olefin.

Carrier solvents of the present technology can contain at least one $C_3$-$C_4$ hydrofluorocarbon olefin or at least one hydrochlorofluorocarbon olefin in any suitable amount. In some examples, carrier solvents can include at least one $C_3$-$C_4$ hydrofluorocarbon olefin or at least one hydrochlorofluorocarbon olefin in an amount of at least about 50% by weight of the carrier solvent, including for example, at least about 70% by weight of the carrier solvent, or at least about 99% by weight of the carrier solvent. For example, carrier solvents can include at least one $C_3$-$C_4$ hydrofluorocarbon olefin or at least one hydrochlorofluorocarbon olefin in an amount of about 55% by weight of the carrier solvent, about 60% by weight of the carrier solvent, about 65% by weight of the carrier solvent, about 70% by weight of the carrier solvent, about 75% by weight of the carrier solvent, about 80% by weight of the carrier solvent, about 85% by weight of the carrier solvent, about 90% by weight of the carrier solvent, or about 95% by weight of the carrier solvent.

It is also contemplated that carrier solvents of the present technology may include one or more co-solvents. Co-solvents may include, for example, an alcohol, a hydrofluorocarbon olefin, or a hydrochlorofluorocarbon olefin. Preferably, co-solvents can be selected to obtain one or more of the following advantages: increasing solubility of the latent fingerprint imaging reagent, decreasing the GWP value of the carrier solvent, and minimizing the use of a more expensive imaging reagent, for example, where the more costly carrier solvent imparted the desired solubility as compared to the co-solvent in use. Some co-solvents include, for example, ethanol, methanol, tetrafluoropropenes, hexafluorobutenes, chlorotrifluoropropenes, or mixtures thereof. Particularly suitable for this application are co-solvent mixtures derived from HFO-1234ze (cis) and HCFO-1233zd. Such mixtures can range from about 1 part to about 99 parts by weight HFO-1234ze (cis) with the corresponding values for HCFO-1233zd ranging from 99 parts to 1 part. Other co-solvent mixtures suitable for application may be derived from HFO-1234ze (cis) and 1,1,1,4,4,4-hexafluoro-2-butene (cis) as well as 1,1,1,4,4,4-hexafluoro-2-butene (trans) and HCFO-1233zd.

In some preferred examples, the carrier solvents of the present technology can include an azeotropic or azeotrope-like mixture of the at least one $C_3$-$C_4$ hydrofluorocarbon olefin or the at least one hydrochlorofluorocarbon olefin with an organic compound. The carrier solvents of the present technology can include an azeotropic or azeotrope-like mixture of the at least one $C_3$-$C_4$ hydrofluorocarbon olefin or the at least one hydrochlorofluorocarbon olefin with an organic compound. Organic compounds that may be suitable in such mixtures include, for example, hydrocarbons such as hexane and heptane, alcohols such as methanol and ethanol, hydrofluorocarbons such as HFC-4310, hydrofluoroethers such as HFE-7000, HFE-7100 HFE-7200, and hydrochlorocarbons such as trans-dichloroethylene.

As used herein, the term "azeotropic or azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant-boiling and cannot be separated during a phase change.

Azeotrope-like compositions are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotrope-like compositions of the invention within the indicated ranges, as well as, certain compositions outside these ranges, are azeotrope-like.

There is a range of compositions containing the same components in varying proportions that are azeotrope-like or constant boiling. All such compositions are intended to be covered by the terms "azeotropic or azeotrope-like" and "constant boiling." As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term "azeotropic or azeotrope-like" as used herein.

Suitable imaging reagents are those that, after contacting the residue of a latent biometric, are capable of rendering a visual image of that biometric. Typically, such renditions involve a chemical reaction between the imaging reagent and one or more compounds of the residue wherein the imaging reagent or one or more of its derivatives are converted into a dye that is visibly detectable. For example, the dye may fluoresce when exposed to light having a certain wavelength, such as, for example, ultraviolet or infrared light. Some suitable imaging reagents include, for example, ninhydrin, hydrindantin, 1,8-diazafluoren-9-one, 1,2-indanedione, and derivatives thereof. A "derivate" is a compound that is functionally and/or structurally related to the referenced compound. Derivatives include, but are not necessarily limited to, products or byproducts of a reaction involving the referenced compound.

Developing compositions of the present technology can be formed by first dissolving the selected imaging reagent, or imaging reagents, in a small amount of a solvent to form a stock solution. The solvent can be a starter solvent, a carrier solvent of the present technology, or a solvent blend. Examples of preferred starter solvents for this initial dissolution include trans-dichloroethylene and organic alcohols, preferably methyl or ethyl alcohol. For example, approximately 100 mg of an imaging reagent can be dissolved in 1 mL of ethanol. The stock solution can be further diluted with at least one carrier solvent of the present technology, such as at east one $C_3$-$C_4$ hydrofluorocarbon olefin, or at least one hydrochlorofluorocarbon olefins, or mixtures there of, to produce the developing composition.

The at least one imaging reagent can be present in a developing composition over a wide range of concentrations. However, for ease of application, the at least one imaging reagent preferably has a concentration on the order of milli-molar (mmol). For example, the at least one imaging reagent can be present in the developing composition in a concentration from about 0.1 mmol to about 200 mmol, or from about 0.1 mmol to about 30 mmol.

It is noted that the developing composition of the present technology do not need to use acetic acid to ensure solubility of the imaging reagents as currently known formulations have indicated. This is yet another advantage of this technology, as providing a developing composition that does not contain acid can yield a formulation with an extended shelf life. In addition, a developing composition that does not contain acid can also have the advantage of not causing inks to run or ridge patterns to coalesce.

In certain preferred embodiments, developing compositions of the present technology can be applied to an article using one of two techniques: (1) "dipping" and (2) aerosol spraying. However, the following description of these two techniques is not intended to suggest or imply that the scope of the technology is limited to only these two techniques. It should be apparent to one skilled in the art that the use of other application techniques, such as atomization where the formulation can be applied via a pump spray bottle is possible.

In the dripping method, the surface of the article contaminated with the fingerprint is placed into a container having a suitable amount of a liquid developing composition. The surface of the article is brought into full contact with the developing composition. Contact times can vary. For example, it was experimentally determined that a contact time of about 1 second to about 120 seconds can be acceptable, including for example contact times from about 10 seconds to about 30 seconds, from about 1 second to about 15 seconds, or from about 2 seconds to about 5 seconds. Contact times in these ranges can produce visualized prints exhibiting good ridge detail and minimizes the potential of obscuring the detail due to solubilization of the deposits on the surface of the article.

In the aerosol spraying method, the developing composition can be deposited by spraying the developing composition on the surface of the article from an aerosol can. The concentration of the developing composition is similar to that described above and the dilution caused by adding a propellant into the aerosol can is neglected. Propellants that can be used for this application include, for example, nitrogen gas, carbon dioxide gas and hydrofluorocarbon olefins which impart suitable pressure to expel the formulation from the canister. Typical of such hydrofluorocarbon olefin gas would be trans-tetrafluoropropene also known as HFO-1234ze (trans) and 2,3,3,3-tetrafluoropropene, also known as HFO-1234yf. The use of these hydrofluorocarbon olefin gases is not intended to limit the scope of propellants selected for this application but is used for purposes of demonstration only. It can be, however, an advantage to use these hydrofluorocarbon olefins as propellants since they are LGWP gases and do not add to the over LGWP values of the system. The amount of time required for spraying is not critical but should be as short as possible to conserve the developing composition. Typically spray times from about 1 second to about 15 seconds are possible, including for example, from about 2 to about 5 seconds.

After dipping or spraying is completed, excess imaging reagent can be removed by either dipping the surface of the article into neat carrier fluid or spraying the surface of the article with neat carrier fluid. To complete the process, the surface of the article can be dried to provide optimum viewing of the visualized fingerprint. Drying can be accomplished by allowing the neat carrier fluid to evaporate by applying heat and moist air at about 100° C. as a means to accelerate the evaporation process. The use of moist air can aid in the development of highlight ridge details, particularly in the case where ninhydrin is used as the imaging reagent.

Latent biometrics on a wide variety of materials can be developed using developing compositions of the present technology. Some example of materials can include fibrous textile, nonwoven, or paper, such as those constructed of cellulose, polyester, polyethylene, acrylic, nylon, polyurethane, olefin, or some combination thereof. Examples of preferred articles include, but are not limited to, photocopier paper, file card paper stock, newspaper, manila envelopes, brown paper bags, newsprint, both black and white and colored, cardboard, notepaper, and paper currency such as banknotes.

Another objective met by the formulations of this technology is to provide an imaging reagent carrier solvent that does not cause inks to streak. In accordance with this objective, the above formulations were tested against the following inks: a red, black or blue ball point pen (Papermate®), Flair pens, gel pens (Avery®) and Sharpie® pens. There was no streaking or running observed with any of the formulations.

EXAMPLES

In order that the technology may be more readily understood, reference is made to the following examples which are intended to be illustrative of the technology, but are not intended to limit the scope of the technology.

Comparative Example 1

This example describes the preparation of a standard formulation using the known HFC-4310mee as carrier which serves as a reference for comparing fingerprint imaging quality.

Ninhydrin (5 g, 0.0281 mol) was dissolved in 15 mL of ethanol containing 5 mL of ethyl acetate and 10 mL of acetic acid. After a homogeneous solution was obtained, it is diluted with 1 L of HFC-4310mee to produce the final formulation used for comparison.

Example 2

This example describes the preparation of a novel formulation according to the present technology.

Ninhydrin (0.1079 g, $6.05 \times 10^{-4}$ mol) was dissolved in 0.75 mL of ethanol. After the ninhydrin dissolved, it was diluted with 30 mL of HFO-1234ze (cis). A homogeneous solution was obtained. This solution was used for developing fingerprints on various articles.

Example 3

This example utilizes all components as described in Example 1 and is used to demonstrate that no deleterious results are obtained using the hydrofluorocarbon olefins of this technology.

Ninhydrin (0.2437 g, $1.367 \times 10^{-3}$ mol) was dissolved in 2.25 mL of ethanol containing 0.1 mL of ethyl acetate and 0.25 mL of acetic acid. After the ninhydrin was dissolved, it was diluted with 50 mL of HFO-1234ze (cis). A homogeneous solution was obtained. This solution was used for developing fingerprints on various articles as described below.

Example 4

This example demonstrates the use of a different HFO in accordance with this patent.

Ninhydrin (0.1431 g, $8.03 \times 10^{-4}$ mol) were dissolved in 0.75 mL of ethanol. After the ninhydrin was dissolved, this solution was diluted with 30 mL of 1,1,1,4,4,4-hexafluoro-2-butene (cis). A homogeneous solution was obtained. This solution was used for developing fingerprints on various articles as described below.

Example 5

This example is used to demonstrate that a different imaging reagent is soluble in HFOs.

DFO (0.0344 g, $1.88 \times 10^{-4}$ mol) was dissolved in 1 mL of ethanol. The dissolution under these conditions did not go to completion. Un-dissolved DFO was removed by filtration and the remaining homogeneous solution diluted with 30 mL of HFO-1234ze (cis). This solution was used for developing fingerprints on various articles as described below.

Example 6

This was a duplication of Example 5 with the exception that 0.25 mL of acetic acid was utilized to affect complete dissolution of the DFO reagent. A homogeneous solution was obtained.

Example 7

The formulation of this example was identical to that described in Example 6 except that the HFO was changed to 1,1,1,4,4,4-hexafluoro-2-butene (cis). A homogeneous solution was obtained.

Example 8

The formulation of this example was identical to Example 6 except that a 50/50 mix of HFO-1234ze (cis) and HCFO-1233zd (by volume) was used as the carrier solvent. A homogeneous solution was obtained.

Example 9

The formulation of this example was similar to that described in Example 2 except that the carrier solvent was a 9% by volume mix of trans-1,2-dichloroethane and HFO-1234ze (cis). A homogeneous solution was obtained.

Example 10

The formulation of this example was similar to that described in Example 2 except that the carrier solvent was a 70/30 mixture of HFO-1234ze (cis) and HCFO-1233zd (by volume). A homogeneous solution was obtained.

Example 11

The formulation of this example was similar to that described in Example 10 except a 50/50 mix of HFO-1234ze (cis) and HCFO-1233zd (by volume) was used as the carrier solvent. A homogeneous solution was obtained.

Example 12

The following examples as directed towards the preparation of an aerosol can containing the following formulation.

Ninhydrin (0.7338 g, $4.12 \times 10^{-3}$ mol) was dissolved in 5 mL of ethanol. This imaging reagent solution was added to 200 mL of HFO-1234ze (cis) and the contents placed into a 300 ml aerosol can. HFO-1234ze (trans) (30 g) was added as propellant for the formulation. A homogeneous solution was obtained. This mixture was used to spray develop latent fingerprints on various articles.

Example 13

The formulation of this example was similar to that of Example 12 except that the propellant gas, HFO-1234yf was used.

Example 14

The formulation of this example was similar to that described in Example 12 except that the HFO was changed to 1,1,1,4,4,4-hexafluoro-2-butene (cis).

The following examples describe the development of latent fingerprints with the formulations of this technology.

Example 15

A piece of photocopier paper having a latent print residue was immersed in the formulation described in Example 2 for 10 seconds, then rinsed with HFO-1234ze (cis) by immersion for 5 seconds then dried at about 100° C. in moist air. The result from this solution was a highly visible purple fingerprint with well defined ridges.

Example 16

This example followed the procedure as described in Example 15 except that the article was changed to file card stock. The result from this solution was a highly visible purple fingerprint with well defined ridges.

Example 17

This example followed the procedure as described in Example 15 except that the article was changed to black and white newspaper print. The result from this solution was a highly visible purple fingerprint with well defined ridges.

Example 18

This example followed the procedure as described in Example 15 except that the article was changed to color newspaper print. The result from this solution was a highly visible purple fingerprint with well defined ridges.

Example 19

This example followed the procedure as described in Example 15 except that the article was changed to a manila envelop. The result from this solution was a highly visible purple fingerprint with well defined ridges.

Example 20

This example followed the procedure as described in Example 15 except that the article was changed to a brown paper bag. The result from this solution was a highly visible purple fingerprint with well defined ridges.

Example 21

This example followed the procedure as described in Example 15 except that the article was changed to cardboard. The result from this solution was a highly visible purple fingerprint with well defined ridges.

Example 22

This example followed the procedure as described in Example 15 except that the article was changed to yellow Post-it notes. The result from this solution was a highly visible purple fingerprint with well defined ridges.

Example 23

This example followed the procedure as described in Example 15 except that the article was changed to paper money. The result from this solution was a highly visible purple fingerprint with well defined ridges.

Example 24

Utilizing the aerosol formulation of Example 12, a piece of photocopier paper was sprayed for 5 seconds with the developer formulation followed by a second rinse in neat HFO-1234ze (cis). Upon drying at about 100° C. in moist air, well developed, highly visible purple fingerprint ridges were obtained.

Example 25

This example followed the procedure as described in Example 22 except that the article was changed to file card stock. The result from this solution was a highly visible purple fingerprint with well defined ridges.

Example 26

This example followed the procedure as described in Example 22 except that the article was changed to black and white newspaper print. The result from this solution was a highly visible purple fingerprint with well defined ridges.

Example 27

This example followed the procedure as described in Example 22 except that the article was changed to color newspaper print. The result from this solution was a highly visible purple fingerprint with well defined ridges.

Example 28

This example followed the procedure as described in Example 22 except that the article was changed to a manila envelop. The result from this solution was a highly visible purple fingerprint with well defined ridges.

Example 29

This example followed the procedure as described in Example 24 except that the article was changed to a brown paper bag. The result from this solution was a highly visible purple fingerprint with well defined ridges.

Example 30

This example followed the procedure as described in Example 24 except that the article was changed to cardboard. The result from this solution was a highly visible purple fingerprint with well defined ridges.

Example 31

This example followed the procedure as described in Example 24 except that the article was changed to yellow Post-it notes. The result from this solution was a highly visible purple fingerprint with well defined ridges.

Example 32

This example followed the procedure as described in Example 24 except that the article was changed to paper money. The result from this solution was a highly visible purple fingerprint with well defined ridges.

Example 33

This example demonstrates the use of a mixed carrier solvent prepared from an HFO and an HCFO.

A 50/50 mix by volume of HFO-1234ze (cis) and HCFO-1233zd was prepared. To 50 mL of this mixture was added ninhydrin (0.1164 g, 6.6×10−4 mol) dissolved in 0.75 mL of ethanol. Photocopier paper, manila envelopes and newspaper print having a latent fingerprint were immersed into this formulation for 10 seconds, then dried at 100° C. containing moist air. In all cases, the fingerprint ridges were well developed.

Example 34

This example is analogous to Example 33 except that the mix of HFO-1234ze (cis)/HCFO-1233zd was changed to 70/30. All fingerprints were well developed.

Example 35

This example demonstrates the use of an HFO with yet another co-solvent.

Ninhydrin (0.1594 g, 8.9×10−4 mol) was dissolved in 0.73 mL of ethanol. This solution was added to 30 mL of a co-solvent solution comprised of HFO-1234ze (cis) and trans-dichloroethylene (9 wt %). Latent fingerprints were obtained from photocopied paper.

Example 36

This example describes the results of exposing various inks to the solvents of this technology.

The following ink samples were scribed onto photocopier paper: black or blue ball point pen (Papermate), Flair pens, gel pens (Avery) and Sharpie pens. The paper was immersed into the formulation described in Example 2 for 10 seconds. No streaking of the inks occurred. Repeated immersion was conducted for an additional 12 cycles. No streaking of any of the inks occurred.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A developing composition for use in producing a visibly detectable image of a latent physiological biometric, the developing composition comprising:
at least one imaging reagent in a carrier solvent, the carrier solvent comprising at least one $C_3$-$C_4$ hydrofluorocarbon olefin selected form the group consisting of tetrafluoropropene, hexafluorobutene, and mixtures thereof or at least one hydrochlorofluorocarbon olefin.

2. The developing composition of claim 1, wherein the at least one $C_3$-$C_4$ hydrofluorocarbon olefin or hydrochlorofluorocarbon olefin is selected from the group consisting of 1-chloro-3,3,3-trifluoropropene, cis-1,3,3,3-tetrafluoropropene and cis-1,1,1,4,4,4-hexafluoro-2-butene.

3. The developing composition of claim 1, wherein the imaging reagent is selected from the group consisting of ninhydrin, hydrindantin, 1,8-diazafluoren-9-one, 1,2-indanedione, and derivatives thereof.

4. The developing composition of claim 1, wherein the carrier solvent comprises the at least one $C_3$-$C_4$ hydrofluorocarbon olefin or at least one hydrochlorofluorocarbon olefin in an amount of at least about 50% by weight of the carrier solvent.

5. The developing composition of claim 1, wherein the carrier solvent comprises the at least one $C_3$-$C_4$ hydrofluorocarbon olefin or at least one hydrochlorofluorocarbon olefin in an amount of at least about 70% by weight of the carrier solvent.

6. The developing composition of claim 1, wherein the carrier solvent comprises the at least one $C_3$-$C_4$ hydrofluorocarbon olefin or at least one hydrochlorofluorocarbon olefin in an amount of at least about 99% by weight of the carrier solvent.

7. The developing composition of claim 1, wherein the at least one hydrochlorofluorocarbon olefin comprises a chlorotrifluoropropene.

8. The developing composition of claim 7, wherein the at least one $C_3$-$C_4$ hydrofluorocarbon olefin comprises a $C_3$-$C_4$ hydrofluorocarbon olefin selected from the group consisting of 1,3,3,3-tetrafluoropropene (cis); 1,1,1,4,4,4-hexafluorobutene (cis) and mixtures thereof.

9. The developing composition of claim 1, wherein carrier solvent comprises an azeotropic mixture of the at least one $C_3$-$C_4$ hydrofluorocarbon olefin and an organic compound.

10. The developing composition of claim 1, wherein the said carrier solvent comprises a mixture of at least one $C_3$-$C_4$ hydrofluorocarbon olefin and at least one hydrochlorofluorocarbon olefin.

* * * * *